United States Patent [19] [11] 4,103,866
Robinson [45] Aug. 1, 1977

[54] BUTTERFLY VALVE
[75] Inventor: Bernie E. Robinson, Milwaukee, Wis.
[73] Assignee: Milwaukee Valve Company, Inc., Milwaukee, Wis.
[21] Appl. No.: 758,066
[22] Filed: Jan. 10, 1977
[51] Int. Cl.² ............................................. F16K 1/22
[52] U.S. Cl. .................................. 251/151; 251/152; 251/305; 251/368
[58] Field of Search ............... 251/148, 151, 152, 305, 251/306, 368; 137/454.2; 285/413

[56] References Cited
U.S. PATENT DOCUMENTS

| | | | |
|---|---|---|---|
| 3,550,902 | 12/1970 | Pidgeon | 251/151 |
| 3,643,916 | 2/1972 | Sandenburgh | 251/151 |
| 3,722,855 | 3/1973 | Massey | 251/151 |
| 3,902,697 | 9/1975 | Robinson | 251/306 |

Primary Examiner—William R. Cline
Attorney, Agent, or Firm—Michael, Best & Friedrich

[57] ABSTRACT

The butterfly valve includes a pair of tailpieces which are threaded onto the outer ends of axially spaced pipe sections of a piping system and have a radially extending flange, a valve unit having a wafer-like body which fits between the tailpieces, and a pair of clamping members, each encircling one of the tailpiece flanges. All of these components preferably are fabricated by a powder-metallurgy process.

The valve unit is supported between the tailpieces by a plurality of bolts which extend through axially alignable, circumferentially spaced apertures in the clamping members and the outer periphery of the valve body. After the butterfly valve has been installed, the valve unit can be removed without disturbing the piping system by removing the bolts or rotated 360° without disturbing the piping by loosening the bolts so that the valve unit and clamping members can be rotated relative to the tailpieces.

12 Claims, 6 Drawing Figures

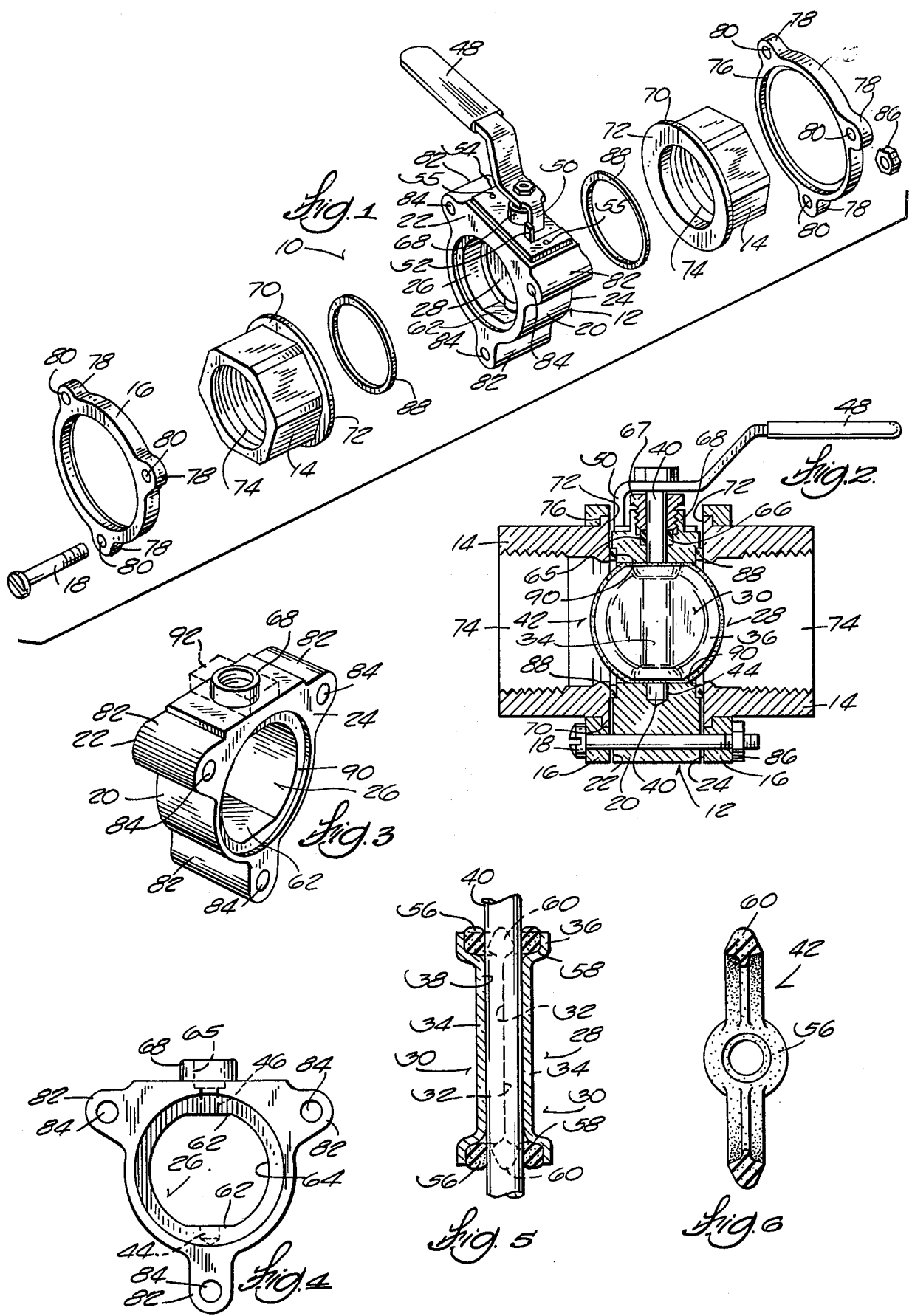

BUTTERFLY VALVE

BACKGROUND OF THE INVENTION

This invention relates to butterfly valves.

Butterfly valves used in conventional piping systems typically employ a valve body which is internally and/or externally threaded at the opposite ends for connection to the piping system. When it is necessary to remove such a butterfly valve for replacement or repair, it usually is necessary to disassemble or loosen certain components of the piping system. Also, the valve usually cannot be rotated to a different position for more convenient location of the operating handle without disturbing the piping system.

Fabrication costs of certain valve components can be reduced by using conventional powder-metallurgy processes because finish machining is minimized. In powder-metallurgy processes, metal powders including small percentages of lubricant are compressed into the desired shape in a mold and are then sintered in a furnace with a non-oxidizing atmosphere to develop metallic properties. The sintering temperature usually is far enough below the melting point so there is no change in shape and size other than a small shrinkage or, in some cases, a slight expansion. The powders must be uniformly compressed throughout the resultant part in order to obtain the desired structural characteristics. The above-mentioned type of valve bodies for butterfly valves normally are too long to afford production by present commercial powder-metallurgy processes.

SUMMARY OF THE INVENTION

An object of the invention is to provide a butterfly valve which is arranged to facilitate removal from and replacement in a piping system without disturbing the piping system.

Another object of the invention is to provide a butterfly valve which, after installation in a piping system, can be rotated 360° without disturbing the piping system.

A further object of the invention is to provide a butterfly valve having a valve body and other components which can be fabricated by conventional powder-metallurgy processes.

Other objects and advantages of the invention will become apparent upon reviewing the following detailed description, the drawing and the appended claims.

The butterfly valve provided by the invention includes a pair of tailpieces which are adapted to be mounted on the ends of adjacent sections of a fluid system and have a radially extending flange, a pair of annular clamping members which encircle the tailpieces, are arranged to clampingly engage the tailpiece flanges, and have a plurality of circumferentially spaced apertures, and a valve unit having a wafer-like body which fits between the inner faces of the tailpiece flanges and has a plurality of circumferentially spaced apertures axially alignable with the apertures of the clamping members. The tailpieces are held in sealing engagement with the opposite end faces of the valve unit body by mounting means such as bolts which extend through the aligned apertures of the clamping members and the valve unit body and which, upon tightening, clamp the tailpieces onto the valve unit body via the clamping members.

The valve unit can be removed without disturbing the piping system by simply removing the mounting bolts from the clamping members and the valve unit body so that the valve unit can be pulled from between the tailpieces. When the mounting bolts are not fully tightened, the clamping members and the valve unit can be rotated relative to the tailpieces, permitting the valve unit to be rotated to any desired position without disturbing the piping system.

Since the valve unit and the means for connecting it to the piping system are separate components, the body can be made shorter than the bodies for conventional butterfly valves threadably mounted in a piping system. Thus, the valve body, as well as the tailpieces and the clamping members, can be, and preferably is, fabricated by a conventional powder-metallurgy process.

BRIEF DESCRIPTION OF THE DRAWING

FIG. 1 is an exploded, perspective view of a butterfly valve embodying the invention.

FIG. 2 is a side elevation, sectional view of the butterfly valve of FIG. 1, shown with its components assembled and with the valve member or disc assembly in the fully open position.

FIG. 3 is a perspective view of the valve unit body for the butterfly valve of FIG. 1.

FIG. 4 is a top plan view of a valve unit body of FIG. 3.

FIG. 5 is a sectional view of the disc assembly shown removed from the valve unit body.

FIG. 6 is a sectional view of a sealing member carried by the disc assembly.

DESCRIPTION OF THE PREFERRED EMBODIMENTS

Illustrated in the drawing is a butterfly valve 10 including a valve unit 12, a pair of tailpieces 14 which are internally threaded for mounting on the ends of adjacent pipe sections of a fluid system (not shown), a pair of annular clamping members 16 which encircle the tailpieces 14, and a plurality of mounting bolts 18 (one shown) for holding the valve unit 12, the tailpieces 14 and the clamping members in the assembled relationship shown in FIG. 2.

The valve unit 12 includes a body 20 having substantially flat, opposite end faces 22 and 24 and a generally cylindrical bore 26 which defines a flow passage extending through the body 20. Mounted for rotation within the bore 26 is a valve member or disc assembly 28 which is preferably arranged and assembled in the manner disclosed in U.S. Pat. No. 3,902,697 which issued Sept. 2, 1975 and is incorporated herein by reference. Basically, the disc assembly 28 includes a pair of identically arranged disc halves 30, each including a flat inner face 32, a generally semicylindrical central portion 34 and a peripheral flange 36. Upon face-to-face assembly of the disc halves 30 with the inner faces 32 juxtaposed, the central portions 34 and the peripheral flanges 38 respectively cooperate to define a hub 38 for receiving a stem 40 and a peripheral groove for receiving a resilient sealing ring 42. The disc halves 30 are suitably fastened to the stem, such as by one or more spot welds, and can be fastened together in the same manner to enhance the structural integrity of the disc assembly 28.

The stem 40 includes an inner end which is journaled in a recess 44 provided in the valve body 20 and an outer end which extends through and is journaled in an aperture 46 provided in the valve body 20 coaxially with the recess 44. A suitable actuator means, such as a handle 48, is operatively connected to the stem 40 for rotating the disc assembly 28, about a transverse axis provided by the stem 40, between a closed position where the plane of the disc assembly is at a right angle to the direction of flow (FIG. 1) and an open position where the plane of the disc assembly is substantially aligned with the direction of flow (FIG. 2).

Located on one end of the handle 48 is an inturned flange 50 which engages a pair of stop lugs 52 (one shown in FIG. 1) provided on a stop plate 54 which is suitably mounted on the exterior of a valve body 20, such as by tap screws 55. The stop lugs 52 are located at 90° to each other so as to limit the rotational travel of the disc assembly 28 between the fully closed and fully open positions.

The sealing ring 42 has a pair of diametrically opposed annular sections 56 which encircle the stem 40 and fit into corresponding annular recesses 58 defined by the assembled disc halves 30 and the stem 40 (FIG. 5) and opposed semicircular sections 60 (FIGS. 5 and 6) which connect the annular section 56 and are sandwiched or clamped between the portions of the peripheral flanges 34 of the disc halves 30 extending between the central portions 34. The semicircular sections 60 preferably have a generally trapezoidal cross section.

The body bore 26 includes diametrically opposed, flattened wall portions 62 in the vicinities surrounding the recess 44 and the aperture 46 and diametrically opposed generally semicircular wall portions 64 (FIG. 4). The periphery of the disc assembly 28 is spaced inwardly a small distance from the bore portions 62 and 64. The annular sections 56 of the sealing ring 42 extend outwardly from the periphery of the disc assembly to provide an interference fit with the flattened wall portions 62 throughout all positions of the disc assembly. The recesses 58 are arranged so that this interference fit causes the sealing ring annular sections 56 to be compressed radially into sealing engagement with the stem 40. Thus, the annular sections of the sealing ring provide fluid tight stem seals at all positions of the disc assembly.

The semicircular sections 60 of the sealing ring 42 extend outwardly beyond the outer periphery of the disc assembly 28 and sealingly engage the corresponding semicircular bore portions 64 when the disc assembly is in the closed position. The dove-tailed or inverted, V-shaped cross section of the groove defined by the cooperating disc half flanges 36 and the trapezoidal shaped cross section of the sealing ring sections 60 cooperate to provide a positive restraint against the sealing ring being twisted or dislodged from the peripheral groove of the disc assembly by high velocity flow during valve operation.

The valve can be arranged to meter flow by providing means for selectively varying the rotational drag on the stem 40 as disclosed in the above-identified U.S. Pat. No. 3,902,697. More specifically, the valve body aperture 46 is counterbored to provide a recess 65 for receiving a packing material 66. The packing material 66 is compressed into engagement with the outer surface of the stem 40 by a gland nut 67 threaded into a boss 68 provided on the valve body 20. The frictional drag imposed on the stem 40 can be adjusted by tightening the gland nut 67 (to increase drag) or by loosening the gland nut 67 (to reduce drag). The packing material 66 can be any suitable valve gland material having a relatively high coefficient of friction, such as a braided asbestos coated with lubricating graphite.

Each of the tailpieces 14 has a radially extending flange 70, a flat inner face 72 and a bore 74 extending therethrough. The bores 74 of the tailpieces 14 have an inside diameter substantially the same as that of the valve body bore 26 and the disc assembly 28 extends into the tailpiece bores 74 when in the open position as shown in FIG. 2.

Each of the clamping members 16 is arranged to encircle a tailpiece 14 and has an annular recess 76 in which the tailpiece flange 70 is received as shown in FIG. 2. The clamping members 16 include a plurality of radially extending, circumferentially spaced projections or ears 78, each having an aperture 80 for receiving a mounting bolt 18. Provided on the outer periphery of the valve body 20 is a plurality of radially extending, circumferentially spaced projections or ears 82 each having an axially extending aperture 84. The valve body apertures 84 are axially alignable with the clamping member apertures 80 for receiving the mounting bolts 18.

When nuts 86 (one shown) threaded onto one end of each mounting bolt 18 are tightened, the tailpieces 14 are urged in sealing engagement with the end faces 22 and 24 of the valve body by the clamping members 16. To improve the sealing, an O-ring 88 preferably is provided for each of the joints between the tailpieces 14 and the valve body 20. The O-rings 88 are constructed from a suitable seal material, such as Teflon, and are disposed in an annular recess 90 provided in the end faces 22 and 24 of the valve body 20 (as shown) or in the inner faces 72 of the tailpieces 14.

For installation of the valve into a piping system, the mounting bolts 18 are loosened so that the tailpieces 14 can be rotated relative to the clamping member 16 and the valve unit 12. After the tailpieces 14 have been threaded onto the fluid system pipe sections and tightened, the valve unit 12 and the clamping members 16 can be rotated relative to the tailpieces 14 to position the valve unit handle 48 at a convenient location and the mounting bolt nuts 86 are tightened to complete the installation.

The valve unit 12 can be removed for repair or replacement without disturbing the piping system by simply loosening and removing the mounting bolts 18 so that the valve unit 12 can be pulled from between the tailpieces 14. A new or the repaired valve unit is installed by inserting same between the tailpieces 14, axially aligning the apertures 80 and 84 of the clamping members 16 and the valve body 20, inserting the mounting bolts 18 through the aligned apertures, rotating the valve unit 12 and the clamping members 16 relative to the tailpieces 14 to locate the valve unit handle 48 at the desired position and then tightening the mounting bolt nuts 86. The valve unit 12 can be rotated to a different position any time after installation without disturbing the piping system by simply loosening the mounting bolt nuts 86 sufficiently so that the valve unit 12 and the clamping member 16 can be rotated relative to the tailpieces 14.

Since the means for mounting the valve in the piping system is separate from the valve body 12, the wafer-like valve body 20 can be considerably shorter than the bodies for conventional butterfly valves threadably mounted in piping systems. For example, a body for a 1-inch valve can be about 0.8 inch long. With this shorter length, the valve body 20 can be, and preferably is, fabricated by a conventional powder-metallurgy process from a suitable metallic composition, e.g., Type 316-L stainless steel. The tailpieces 14 and the clamping members 16 preferably are also made by a conventional powder-metallurgy process from the same metallic composition.

Finishing requirements are minimized when a powder-metallurgy process is used for making the valve body 20, the tailpieces 14 and the clamping member 16. For example, the valve body 20 can be formed with a rectangular rib 92 as shown by the dashed lines in FIG. 3. A conventional turning operation is then performed to remove the excess material and form the exterior boss 68 for the stem 40. Basically, the only other finishing required for the valve unit body 12 are the drilling and/or tapping operations to form the recess 44, the aperture 46 and the counterbore to form the recess 65, the threads for the gland nut 67 and the mounting holes for the stop plate tap screws 55. The bore of the tailpieces 14 can be formed during molding so that the only finishing step required is a tapping operation to form the threads. The clamping members 16 can be molded so that no finishing is required.

The disc halves 30 preferably are formed from a thin sheet material, such as 1/32 inch stainless steel, by a conventional metal stamping process.

I claim:

1. A butterfly valve adapted to be mounted between axially spaced tubular sections of a fluid system comprising
   a pair of tailpieces, each adapted to be mounted on the end of one of the tubular sections and having a radially extending flange including an inner face;
   a pair of annular clamping members, each adapted to fit over and slidably encircle one of said tailpieces and including a plurality of circumferentially spaced apertures, said apertures of one clamping member being axially alignable with the apertures of the other clamping member;
   a valve unit including
      a valve body having opposed end faces fitting between said tailpiece inner faces in face-to-face relationship, a bore defining a flow passage extending between said end faces, and a plurality of circumferentially spaced apertures located on the outer periphery thereof and axially alignable with said clamping member apertures, and
      a valve member mounted in said valve body bore for rotation about an axis extending transversely of said flow passage between an open position and a closed position to shut off flow through said flow passage; and
   mounting means extending through said clamping member apertures and said valve body apertures for supporting said valve unit between said tailpieces and for moving the inner faces of said tailpieces into clamping engagement with the end faces of said valve body when said mounting means is moved to a clamping position, whereby said valve unit and said clamping members can be rotated as a subassembly relative to said tailpieces when said mounting means is in an unclamping position.

2. A butterfly valve according to claim 1 wherein said tailpieces are internally threaded for threadable mounting on the tubular sections.

3. A butterfly valve according to claim 1 wherein said mounting means comprises bolts which, upon tightening and acting through said clamping members, urge the inner faces of said tailpieces into engagement with the end faces of said valve body.

4. A butterfly valve according to claim 3 including an annular sealing member disposed between each of said tailpiece inner faces and said valve body end faces.

5. A butterfly valve according to claim 4 wherein each of said valve body end faces include an annular recess receiving a respective one of said sealing members.

6. A butterfly valve according to claim 1 wherein said valve body is formed by a powder-metallurgy process.

7. A butterfly valve according to claim 6 wherein said clamping members are formed by a powder-metallurgy process.

8. A butterfly valve according to claim 7 wherein said tailpieces are formed by a powder-metallurgy process.

9. A butterfly valve according to claim 1 wherein said valve unit includes
   a stem rotatably mounted in said valve body and extending transversely of said flow passage;
   a pair of relatively thin circular discs disposed in confronting face-to-face relationship, each of said disc halves being formed wih a diametrically extending semicircular groove portion cooperating with the corresponding semicylindrical portion of the other of said disc halves to define a hub receiving said stem and each of said disc halves also being formed with a peripheral flange lying away from a plane coincident with the confronting face and cooperating with the corresponding peripheral flange on the other of said disc halves to define a peripheral groove for receiving a sealing ring, said cooperating flange compressingly engaging said sealing ring to positively restrain said sealing ring from being twisted or dislodged from said peripheral groove during opening and closing of said valve member; and
   means for securing both of said disc halves to said stem.

10. A butterfly valve according to claim 9 wherein
    said valve body bore includes diametrically opposed flattened wall portions in the vicinity of said stem and diametrically opposed generally semicircular wall portions adjoining said flattened wall portions;
    said peripheral groove includes a pair of diametrically opposed annular portions respectively encircling the opposite ends of said stem hub and a pair of diametrically opposed generally semicircular portions extending circumferentially between corresponding of said annular portions;
    said sealing ring is a unitary member and includes a pair of opposed annular sections disposed in corresponding of said annular groove portions, said annular sealing section being in an interference fit with the corresponding flattened wall portions of said bore throughout all positions of said valve member; and
    said sealing ring further includes a pair of opposed, generally semicircular sections connecting said annular sections in disposed in corresponding of said semicircular groove portions, said semicircular sealing ring sections sealingly engaging corresponding semicircular wall portions of said bore when said valve member is in a closed position.

11. A butterfly valve according to claim 10 wherein each of said disc halves is formed from a thin sheet of stainless steel and said securing means comprises a welded connection between each of said semicircular portions and said stem on opposite sides of said stem.

12. A butterfly valve according to claim 11 wherein said disc halves are formed by stamping.

* * * * *